(12) United States Patent
Wacker et al.

(10) Patent No.: US 8,007,706 B2
(45) Date of Patent: Aug. 30, 2011

(54) METHOD FOR THE PRODUCTION OF A MOLDED PART

(75) Inventors: Marco Wacker, Wilhermsdorf (DE); Joerg Russ, Altdorf (DE)

(73) Assignee: Jacob Composite GmbH, Willhelmsdorf (DE)

( * ) Notice: Subject to any disclaimer, the term of this patent is extended or adjusted under 35 U.S.C. 154(b) by 263 days.

(21) Appl. No.: 11/728,796

(22) Filed: Mar. 27, 2007

(65) Prior Publication Data

US 2007/0235900 A1 Oct. 11, 2007

(30) Foreign Application Priority Data

Mar. 28, 2006 (DE) .......................... 10 2006 014 313

(51) Int. Cl.
*B29C 39/38* (2006.01)

(52) U.S. Cl. ........ 264/322; 264/255; 264/263; 264/274; 264/319

(58) Field of Classification Search ............... 264/255, 264/263, 274
See application file for complete search history.

(56) References Cited

U.S. PATENT DOCUMENTS

| | | | | |
|---|---|---|---|---|
| 3,474,051 A | * | 10/1969 | Trementozzi et al. | 521/59 |
| 4,446,253 A | * | 5/1984 | Hahn et al. | 521/79 |
| 5,087,514 A | * | 2/1992 | Graefe | 428/315.5 |
| 5,252,163 A | * | 10/1993 | Fell | 156/205 |
| 5,283,918 A | * | 2/1994 | Weingartner et al. | 297/452.21 |
| 5,343,973 A | * | 9/1994 | Lanker | 180/211 |
| 5,395,580 A | | 3/1995 | Morita et al. | |
| 5,529,826 A | * | 6/1996 | Tailor et al. | 428/110 |
| 5,686,033 A | * | 11/1997 | Shimizu | 264/127 |
| 6,682,675 B1 | * | 1/2004 | Vandangeot et al. | 264/161 |
| 2001/0046822 A1 | | 11/2001 | Yoshikawa et al. | |
| 2004/0144781 A1 | * | 7/2004 | Dees et al. | 220/4.24 |
| 2005/0211480 A1 | * | 9/2005 | Kejha | 180/65.2 |
| 2005/0263044 A1 | * | 12/2005 | Bearse et al. | 108/57.25 |
| 2005/0277353 A1 | * | 12/2005 | Lovasic et al. | 442/414 |

FOREIGN PATENT DOCUMENTS

DE 10338109 12/2004
EP 649736 B1 * 7/1998

OTHER PUBLICATIONS

Böge, Alfred "Das Techniker Handbuch" 1999, Vieweg, Wiesbaden, p. 574, Abstract 5.1.

* cited by examiner

*Primary Examiner* — Jennifer K. Michener
*Assistant Examiner* — Magali P Slawski
(74) *Attorney, Agent, or Firm* — Dilworth & Barrese, LLP.

(57) ABSTRACT

The invention relates to a method for the production of a molded part which comprises a base part consisting of a plurality of layers and a thermoplastic or duroplastic synthetic material bonded therewith, the bond of the base part with the thermoplastic or duroplastic synthetic material being formed such that the thermoplastic or duroplastic synthetic material is deformed under a pressure to become flowable, or that it is introduced already liquefied under pressure and forms a bond with the base part. According to the invention, the production of the base part and the production of the bond of the thermoplastic or duroplastic synthetic material with the base part is carried out in the same die.

36 Claims, No Drawings

METHOD FOR THE PRODUCTION OF A MOLDED PART

BACKGROUND OF THE INVENTION

This invention relates to a method for the production of a molded part which comprises a base part consisting of a plurality of layers and a thermoplastic or duroplastic synthetic material bonded therewith, the bond of the base part with the thermoplastic or duroplastic synthetic material being formed such that the thermoplastic or duroplastic synthetic material is deformed under pressure to become flowable, or that it is introduced already flowable under pressure and thereby or subsequently forms a bond with the base part.

A method is known from DE 103 38 109 wherein a composite material is inserted into a pressing mold in a first method step; in a second method step, the thermoplastic synthetic material is positioned in marginal areas of the composite material, and in additional method steps, the composite material as well as the thermoplastic synthetic material are compressed, the thermoplastic synthetic material being compressed at a pressure at which the thermoplastic synthetic material becomes flowable. In this manner, a bond is formed between the thermoplastic synthetic material and the composite material.

In accordance with DE 103 38 109, the composite material is inserted in finished condition into the pressing mold.

SUMMARY OF THE INVENTION

It is the objective of this invention to further develop a method of the type mentioned above such that it can be carried out in a particularly simple manner.

This objective is solved by a method with the features herein.

According to that, it is provided that the production of the base part and the production of the bond of the thermoplastic or duroplastic synthetic material with the base part is carried out in the same die. In this manner, the production of the base part as well as its bond with the thermoplastic or duroplastic synthetic material is realizable by only using one die. A specifically intended device for the production of the base part is thus unnecessary according to the invention.

It is preferably provided that, in one method step, at least two layers of the base part are inserted into the die and then deformed so that a connection is created between these layers and that, in another method step, the thermoplastic or duroplastic synthetic material is inserted and subsequently deformed at the mentioned high pressure such that the thermoplastic or duroplastic synthetic material becomes flowable and thereby or then is bonded with the base part or with its layers, respectively. It is also conceivable that the thermoplastic or duroplastic synthetic material is injected, in already flowable condition, under pressure into the die and thereby or then forms a bond with the base part or its layers, respectively.

In accordance with the invention, it can be provided that the thermoplastic or duroplastic synthetic material forms an initially geometrically limited area or marginal area of the molded part on which e.g. hooks, eyelets, straps, or other elements may be arranged by means of which the finished molded part can be fastened or arrested in a suitable manner.

The number of layers of which the base part consists is largely arbitrary. It is conceivable, for example, that the base part is a composite material consisting of a core layer which may be honeycomb or cellular in design and that both sides of this core layer are provided with a covering layer which covers the core layer on the top and on the bottom.

It can furthermore be provided that the production of the base part and the production of the bond between base part and thermoplastic or duroplastic synthetic material is performed simultaneously or in succession.

It is principally conceivable that the invention is implemented in a die which has different stamps by means of which different pressures can be applied. Thus, it is conceivable, for example, that a first stamp is provided which acts on the base part which is executed, for example, as composite material, and that a second stamp is provided which acts upon the thermoplastic or duroplastic synthetic material. It is conceivable, for example, that the stamp acting upon the thermoplastic or duroplastic synthetic material is not applied until all layers of the base part are bonded with each other and will only then be applied, with the thermoplastic or duroplastic synthetic material—as described above—then being deformed at a pressure which results in a flow of this material so that it forms a close bond with the base part.

As an alternative thereto, it can also be provided that the thermoplastic or duroplastic synthetic material is not made to flow only by the pressure in the die but that it is introduced into the die in an already liquid or at least flowable condition, preferably injected into it under pressure.

A further embodiment of the invention provides that—as described above—the base part or, respectively, the composite material comprises at least a layer which has a cellular or honeycomb structure. However, such a core structure is not a stringent but rather an optional feature of the base part or the composite material, respectively.

As explained above, the base part can be a composite material. This is not stringent, however. The base part can also be made, for example, of thermoplastic or duroplastic laminated ware which may be reinforced or non-reinforced.

Another embodiment of the invention provides that at least one of the layers of the base part has a single-layer or multi-layer structure in turn. In that case, the layers of the base part may consist, for example, of a single-layer or multi-layer composite material or even of other materials, such as a thermoplastic or duroplastic synthetic material.

Thus, at least one of the layers of the base part can be formed, for example, by a composite material or even by a thermoplastic or duroplastic material.

Another embodiment of the invention provides that one layer, a plurality of layers or all layers of the composite component are preheated in the die, prior to deforming.

Such preheating can be effected such that the corresponding layers are heated up to the desired temperature, for example by means of IR radiation, microwaves, laser or circulating air or hot air, or by a combination of these methods. It is conceivable, for example, that hot air is blown onto the layers located above and/or below the core layer so that they will have the desired temperature. It is furthermore conceivable that the layers are heated to the desired temperature in a circulating air oven, by means of IR radiation or by means of other measures. The same applies, of course, analogously for any possible core layer or honeycomb structure. These layers as well can be heated up before the production of the base part or the composite material, respectively.

The base part can be produced, for example, by the twin-sheet molding method. This method which is also known as twin-sheet forming is performed by using two die halves into which the preheated layers are introduced, with the layers resting as far as possible completely on the die. Then, the layers are e.g. bonded with each other in the desired manner to form a base part which is hollow in design, for example.

It is also conceivable to produce the base part by the vacuum forming method. The vacuum achieves that the layers of the base part rest particularly well on the die.

Another embodiment of the invention provides that pressure is applied between the two layers of the base part which also has the advantage that the layers rest as well as possible on the die. Pressure can be applied, for example, by means of a suitable gas. It is also possible to introduce a foam between two layers of the base part; for example, an expanding foam which will harden after a certain period of time, or a thermoplastic foam which is efflorescent. A foamed twin-sheet part can thus be produced, for example, which features good thermal or acoustic insulation and moreover has excellent stability.

Another embodiment of the invention provides that the base part is produced by the matched-die molding method. Especially composite components can be advantageously produced in this manner.

Another embodiment of the invention provides that one layer, a plurality of layers, or all layers of the base part are fixed in position in one frame or a plurality of frames upon introduction into the die. The fixation of these layers in the frame will be loosened as soon as the corresponding layer is deformed with the other layers of the base part.

It is conceivable, for example, to use two frames, one of which fixes the layer to be applied above a core layer of the composite material and another the layer to be applied below the core layer.

However, one disadvantage is basically that undesirable scrap must possibly be expected when such a frame is used.

To avoid the scrap, it may be provided for example that preferably two holding frames arranged in parallel will fix the top and bottom layer of the base part or, respectively, the composite material prior to forming and charge it such that the holding areas are subsequently reformed or sprayed, respectively, with thermoplastic or duroplastic synthetic material. This procedure is principally applicable even with only one layer or with more than two layers.

To achieve adequate bonding to the thermoplastic or duroplastic synthetic material even with those holding areas which are cooler than the other areas of the layers, it may be provided that the holding areas comprise one opening or a plurality of openings into which the thermoplastic or duroplastic synthetic material can penetrate so that, in these sections, at least a form-fit bonding is achieved between the thermoplastic or duroplastic synthetic material and the layer or the layers of the base part.

To remedy the disadvantage of scrap, it can be furthermore provided that one layer, a plurality of layers or all layers of the base part will be placed—upon introduction in the die—onto a fabric structure or on a plurality of strands, especially on fiber strands. In this case, the use of a mentioned frame fixing the layers will not be required. The scrap of layer material can thus be minimized. The fabric structure or the strands, respectively, preferably remain on the base part and thus form a component part of the finished molded part. It is preferably provided that the fabric or the strands are designed such that they will improve the mechanical properties of the finished molded part or contribute to its stability, respectively.

The fabric or the strands, respectively, can be a fabric structure, for example, or strands of glass fibers, metallic fibers, or a synthetic material such as PTFE.

The fabric structure or the strands can be or will be pretreated for the purpose of improving adhesion. It is conceivable, for example, to sputter them in advance to improve adhesion.

The use of a finishing agent is also conceivable as an adhesive agent.

Another embodiment of the invention provides that the fabric structure or the strands are or will be produced according to the commingling method. With this method, mixtures of reinforcement and matrix strands with an adjustable fiber/volume ratio can be produced in the composite material. It is conceivable, for example, that the matrix filaments are formed by thermoplastic or duroplastic fibers.

Another embodiment of the invention provides that the basic material is fixed on needles and is then transported.

Another embodiment of the invention provides that the composite material comprises at least one layer which has a cellular or honeycomb structure and that this layer is deformed with other layers of the composite component at a pressure of 50 bar maximum, preferably 20 to 30 bar. This comparatively low pressure is required so that the cellular or honeycomb structure will not be destroyed during the deforming process but that its arrangement is maintained.

In contrast thereto, it may be provided that the thermoplastic or duroplastic synthetic material is deformed at a pressure of 250 bar maximum. As explained above, at such pressures, plastic deformation or, respectively, flowing of the thermoplastic or duroplastic synthetic material will result, whereupon this material forms a strong bond with the adjacent composite material.

As stated above, it is not stringently required to apply the mentioned high pressures to make the synthetic material flow. Much rather, it is also possible to introduce the material into the die already in flowable condition, preferably under pressure.

The layers of the base part may be polyamide, polybutylene terephthalate, polyethylene or polypropylene, or even high-temperature thermoplastics, such as PPS (polyphenylene sulfide) or PEI (polyetherimide). Even the application of thermoplastic elastomers (TPEs) is possible.

It can furthermore be provided that the layers of the base part are reinforced. Possible is e.g. a reinforcement by glass fibers, carbon fibers, natural fibers, aramide fibers, metallic fibers and/or synthetic fibers.

It is also conceivable that the layers of the base part comprise or consist of inherently reinforced polymers. In this case, Curv® and PURE® can be mentioned as examples.

Another embodiment of the invention may finally provide that the composite material comprises at least one layer which has a cellular or honeycomb structure, with this layer consisting of the materials according to any one of the claims 24 to 26 or of paper, cardboard, or metal, especially of aluminum.

To prevent any penetration of thermoplastic or duroplastic synthetic material into the base part, especially into any honeycomb or cellular core layer of a composite material, it may be provided that the plurality of layers of the base part is deformed by the die such that no thermoplastic or duroplastic synthetic material can flow into the base part. The separation between the stamps can thus be covered via the layers of the base part. It is principally also conceivable to provide a projection on the stamp or stamps to produce a corresponding depression in the base part which will prevent thermoplastic or duroplastic material from flowing into the base part.

Another embodiment of the invention provides that one layer, a plurality of layers, or all layers of the base part comprise at least a holding area in which the layers are fixed by frames or another holding device, with the holding areas being charged such that they are reformed with the thermoplastic or duroplastic synthetic material.

It is especially advantageous when the holding area or the holding areas comprise(s) one opening or a plurality of openings into which the thermoplastic or duroplastic synthetic material penetrates for the purpose of producing a form-fitting bond. Due to their contact with the holding device, the holding areas are cooler than the other areas of the base part so that, in accordance with this embodiment of the invention and for a stabilization of the connection in these areas, a form-fitting bond is provided between the thermoplastic or duroplastic material and the base part.

The invention relates furthermore to a molded part which has been produced in accordance with the method according to the invention.

DESCRIPTION OF THE PREFERRED EMBODIMENTS

Further details and advantages of the invention are explained below in detail in an exemplary embodiment.

The exemplary embodiment relates to the production of a composite material which consists of a honeycomb core layer and two covering layers which are to be provided on the top side and the bottom side of the core layer.

To this effect, it is provided that first the honeycomb core layer is combined with one of the halves of the die, that the first covering layer is fixed by means of a frame between the two mold halves of the die and that the mold halves are then brought together so that the honeycomb core structure bonds closely with this covering layer.

The mold halves are subsequently opened again and, on the other side of the core layer, a second covering layer is introduced by means of a frame between the two open mold halves. The mold halves are then closed again, and a bond is formed between the honeycomb core layer and this second covering layer.

During this process or even subsequently, it may be provided that a marginal material of thermoplastic synthetic material is inserted into the die. For deforming this, it is provided that the die comprises another stamp which works at a pressure of approx. 200 to 250 bar. By activating this external stamp, the thermoplastic or duroplastic synthetic material is rendered into a flowable condition whereupon it bonds with the marginal area of the composite material already produced.

The covering layers can consist of a thermoplastic or duroplastic synthetic material. It is principally conceivable to use polyamide, polybutylene terephthalate, PE or PP, or even high-temperature thermoplastics, such as PPS or PEI or of TPEs. These synthetic materials can also be glass fiber reinforced or reinforced in a different manner.

For the honeycomb core layer, the same materials as for the covering layers are basically possible. Paper, cardboard, aluminum can also be used alternatively or additionally.

To effect a tight bond of the layers with each other, it can be provided that they are preheated. For example, the honeycomb core layer can be heated by means of blowing hot air. The covering layers can also be heated up prior to their deformation with the honeycomb core layer. It is conceivable, for example, to heat up by means of IR radiation, or by a circulating air oven or a combination of these methods, with the temperature at approx. 260° C. to 400° C. depending on the synthetic material.

So as not to destroy the honeycomb structure during deformation or, respectively, during the production of the composite material, it is provided that the inner stamp of the die operates at a pressure of up to approx. 30 bar. In contrast thereto, it is provided that the outside stamp which acts on the thermoplastic or duroplastic synthetic material will work at pressures ranging between 200 bar and 250 bar.

The die can thus comprise two stamps which can preferably be operated independently of each other and which can apply the different pressures.

As an alternative to the procedure of fixing the individual layers of the composite material in a frame, it can be provided to arrange the composite material or, respectively, its layers on a fabric structure which may be, for example, glass, metal, PTFE, etc. With such an arrangement, it is possible to avoid the scrap which can result when a holding frame is used for the layers of the composite material.

Furthermore, it can be provided that two holding frames arranged in parallel will fix the top and the bottom layer of the composite material prior to forming and charge them such that the holding areas are subsequently reformed with the thermoplastic or duroplastic material so that scrap can be avoided.

To ensure still an adequate bond with the thermoplastic or duroplastic material at the cooler holding areas, it can be intended to provide them with openings to develop a form-fitting bond.

The invention claimed is:

1. Method for the production of a molded part which comprises a base part having a plurality of layers and a thermoplastic or duroplastic synthetic material bonded therewith, comprising the steps of
   firstly, inserting at least two layers of the base part into a die and deforming the same with a first stamp to create a connection between these layers,
   subsequently, forming the bond of the base part with the thermoplastic or duroplastic synthetic material such that the thermoplastic or duroplastic synthetic material is deformed with a second separate stamp in the same die under a pressure to become flowable, or introduced already liquefied under pressure and forms a bond with the base part, and
   carrying out the production of the base part and bonding of the thermoplastic or duroplastic synthetic material with the base part in the same die with said first and second separate stamps, wherein
   in one method step, at least two layers of the base part are inserted into a die and deformed therein so that a connection is created between these layers, and in another method step, a thermoplastic or duroplastic synthetic material is inserted into the die already liquefied and then forming a bond with the base part.

2. Method according to claim 1, wherein the production of the base part and bond between the base part and thermoplastic or duroplastic synthetic material is performed simultaneously or in succession.

3. Method according to claim 1, wherein the base part is a composite material.

4. Method according to claim 1, wherein at least one of the layers of the base part has a single-layer or multi-layer structure in turn.

5. Method according to claim 1, wherein at least one of the layers of the base part is formed by a composite material or by a thermoplastic or duroplastic material.

6. Method according to claim 1, wherein the base part comprises at least one layer which has a cellular or honeycomb structure.

7. Method according to claim 1, wherein one layer, a plurality of layers, or all layers of the base part are preheated in the die, prior to deforming.

8. Method according to claim 7, wherein preheating is achieved through the effect of IR radiation, microwaves, laser or hot air, or a combination thereof on the layers of the base part.

9. Method according to claim 1, wherein the base part is produced by the twin-sheet molding method.

10. Method according to claim 1, wherein the base part is produced by a vacuum forming method.

11. Method according to claim 1, wherein pressure is applied between two layers of the base part during its production.

12. Method according to claim 1, wherein a foam is introduced between two layers of the base part during or after its production.

13. Method according to claim 1, wherein the base part is produced by a matched-die molding method.

14. Method according to claim 1, wherein one layer, a plurality of layers, or all layers of the base part are fixed in position in one frame or a plurality of frames upon introduction into the die.

15. Method according to claim 1, wherein one layer, a plurality of layers, or all layers of the base part are placed, upon introduction into the die, onto a fabric structure or on a plurality of strands.

16. Method according to claim 15, wherein the fabric structure or the strands are composed of glass fibers, metal fibers or synthetic fibers.

17. Method according to claim 15, wherein the fabric structure or the strands are or will be pretreated for the purpose of improving adhesion.

18. Method according to claim 15, wherein the fabric structure or the strands are or will be produced according to the commingling method.

19. Method according to claim 1, wherein before or upon introduction into the die, one layer, a plurality of layers, or all layers of the base part are fixed by needles and transported.

20. Method according to claim 1, wherein the base part is a composite material which comprises at least one layer which has a cellular or honeycomb structure and this layer is deformed with other layers of the composite component at a pressure of 50 bar maximum.

21. Method according to claim 1, wherein the thermoplastic or duroplastic synthetic material is deformed at a pressure of 250 bar maximum.

22. Method according to claim 1, wherein the layers of the base part are composed of polyamide, polybutylene terephthalate, polyethylene or polypropylene or high-temperature thermoplastics or thermoplastic elastomers (TPEs).

23. Method according to claim 1, wherein the layers of the base part are reinforced by glass fibers, carbon fibers, natural fibers, aramide fibers, metallic fibers and/or synthetic fibers.

24. Method according to claim 1, wherein the layers of the base part comprise inherently reinforced polymers.

25. Method according to claim 1, wherein the base part is a composite material which comprises at least one layer which has a cellular or honeycomb structure, with this layer composed of paper, cardboard or metal.

26. Method according to claim 1, wherein the plurality of layers of the base part is deformed by the die such that the separation between the stamps of the die is covered by the layers of the base part and no thermoplastic or duroplastic synthetic material can flow into the base part.

27. Method according to claim 1, wherein one layer, a plurality of layers, or all layers of the base part comprise at least a holding area in which the layers are fixed by frames or another holding device, with the holding areas being charged such that they are reformed with the thermoplastic or duroplastic synthetic material.

28. Method according to claim 27, wherein the holding area or the holding areas have at least one opening or into which the thermoplastic or duroplastic synthetic material penetrates for the purpose of producing a form-fitting bond.

29. Method according to claim 15, wherein the strands are fiber strands.

30. Method according to claim 16, wherein the synthetic fibers are PTFE.

31. Method according to claim 20, wherein the pressure is from 20 bar to 30 bar.

32. Method according to claim 22, wherein the high-temperature thermoplastics are PPS (polyphenylene sulfide) or PEI (polyetherimide).

33. Method according to claim 25, wherein the metal is aluminum.

34. Method according to claim 20, wherein the thermoplastic or duroplastic material is deformed at a pressure of 250 bar maximum.

35. Method according to claim 1, wherein the first stamp operates at a pressure up to about 30 bar, and the second stamp operates at a pressure of about 200 to 250 bar.

36. Method according to claim 1, wherein the thermoplastic or duroplastic synthetic material is already liquefied under pressure when inserted into the die.

* * * * *